United States Patent [19]

Clark

[11] Patent Number: 5,526,922
[45] Date of Patent: Jun. 18, 1996

[54] HIGH LIFT BUCKET

[76] Inventor: Philip G. Clark, 1608 Larkspur Trail, Sioux Falls, S. Dak. 57106

[21] Appl. No.: 264,448

[22] Filed: Jun. 23, 1994

[51] Int. Cl.⁶ .................................................. B65G 17/36
[52] U.S. Cl. ........................ 198/708; 198/711; 198/713
[58] Field of Search ................................ 198/701, 703, 198/708, 710, 711, 713

[56] References Cited

U.S. PATENT DOCUMENTS

| | | | |
|---|---|---|---|
| 970,283 | 9/1910 | Wilfley | 198/708 X |
| 2,960,209 | 11/1960 | Everhart | 198/708 |
| 2,973,854 | 3/1961 | Roloson | 198/713 |
| 3,083,814 | 4/1963 | Meyer | 198/701 X |
| 3,265,189 | 8/1966 | Larson et al. | 198/708 |
| 3,286,816 | 11/1966 | Knaust et al. | 198/708 |
| 3,679,045 | 7/1972 | Morgan et al. | 198/711 X |
| 3,704,774 | 12/1972 | Van der Winden | 198/708 |
| 3,737,025 | 6/1973 | Miller et al. | 198/708 |
| 3,795,305 | 3/1974 | Sandvik | 198/708 X |
| 4,019,625 | 4/1977 | Wiese | 198/708 |
| 4,770,287 | 9/1988 | Glowatzki | 198/708 X |
| 5,143,203 | 9/1992 | Hinner | 198/711 X |

FOREIGN PATENT DOCUMENTS

| | | | |
|---|---|---|---|
| 2558449 | 7/1985 | France | 198/713 |
| 2249724 | 5/1974 | Germany | 198/708 |
| 2835350 | 2/1979 | Germany | 198/713 |
| 0157610 | 9/1983 | Japan | 198/711 |
| 720533 | 12/1954 | United Kingdom | 198/708 |

Primary Examiner—James R. Bidwell
Attorney, Agent, or Firm—Merchant, Gould, Smith, Edell, Welter & Schmidt

[57] ABSTRACT

A belt type conveyor includes buckets which include front and rear forward angling walls for nesting. The front walls act as a retaining wall and a pour chute for discharging material at the correct time and location. The buckets may also include rear portions which direct material falling onto the rear portion into the next bucket. The rear portions may also include a wear block mounted at the top of the rear wall for preventing wear on the remaining portions of the bucket. The buckets may include flanges extending on either side, which ride under bogies for maintaining proper tension and for following the correct desired path of the conveyor.

22 Claims, 5 Drawing Sheets

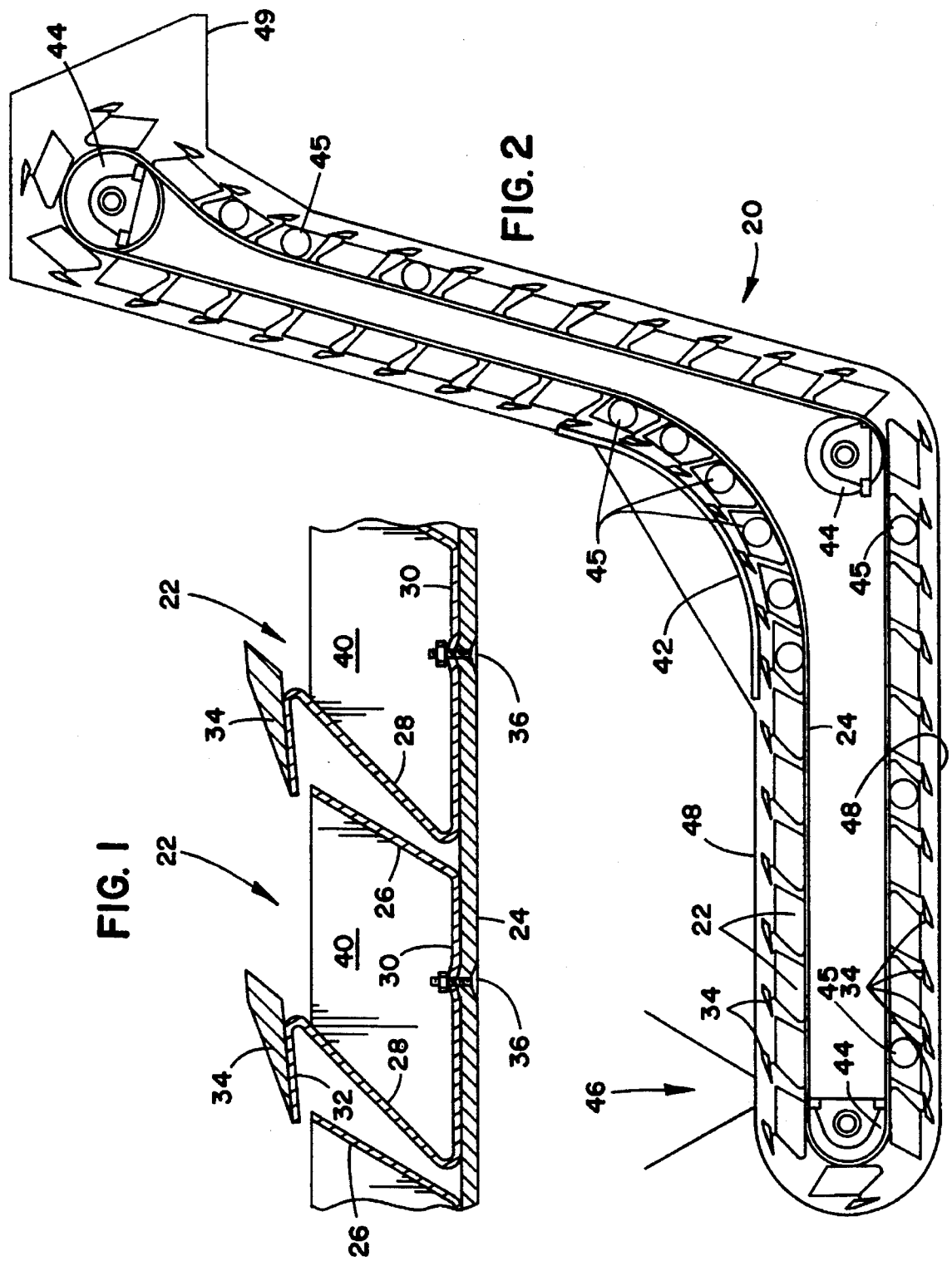

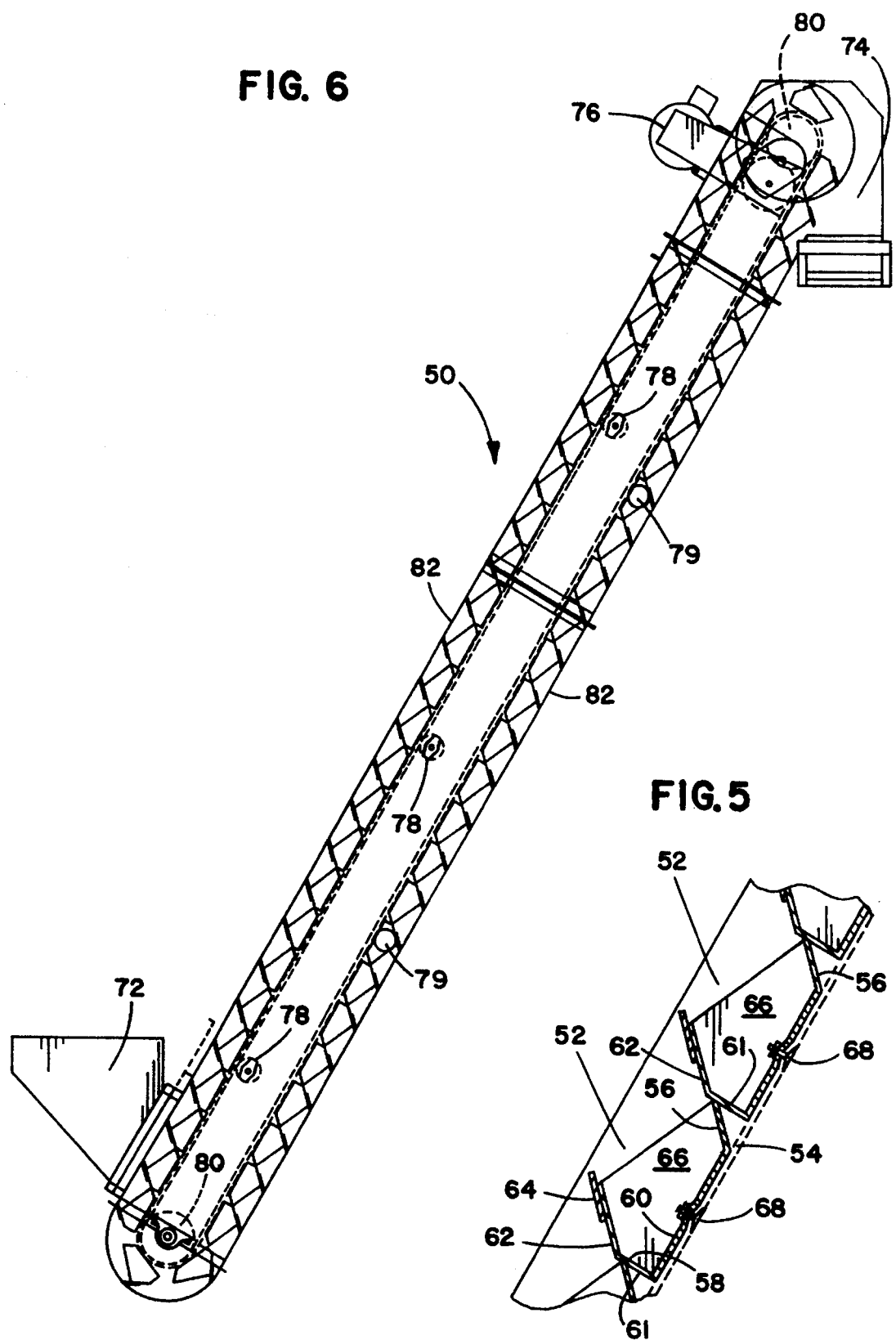

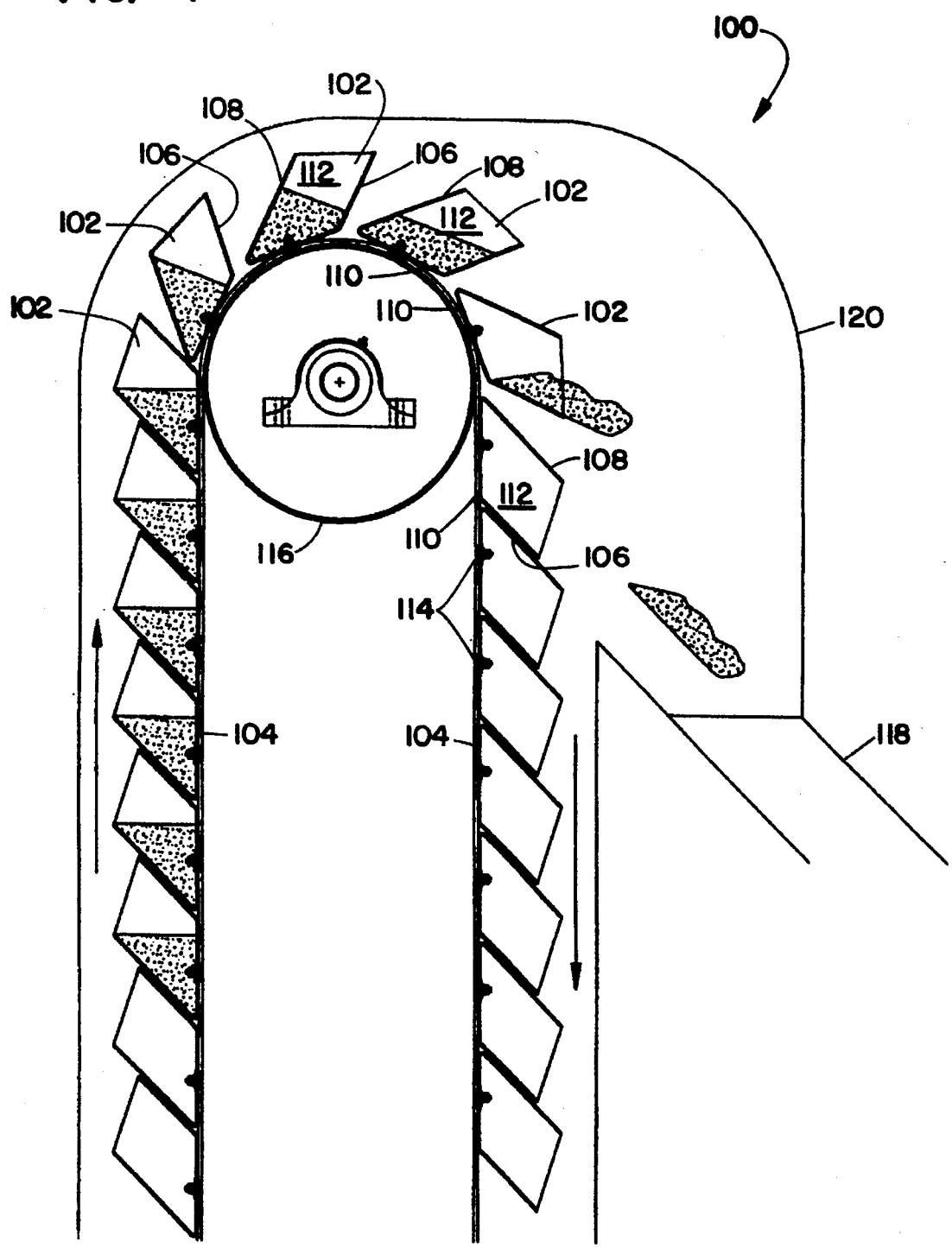

HIGH LIFT BUCKET

BACKGROUND OF THE INVENTION

1. Field of the Invention

The present invention relates to a conveyor bucket device and in particular to a bucket device used with belt conveyors.

2. Description of the Prior Art

Conveyors which utilize buckets are well known. Common types of conveyors using buckets include chain conveyors which have chains connecting and supporting buckets and to a very limited degree, belt conveyors, which mount buckets on the surface of the belt. They are used for a variety of purposes and take on many forms for many different types of conveying. The type of bucket and conveyor used also varies with the path of the conveyor. For example, with straight line conveyors, one type of bucket may be used, or no bucket may be used, while in vertical conveyors, conveyors which go up or down inclines, or include changes in incline, different types of conveyors and/or buckets may be used.

One problem with typical conveyor buckets is that the buckets do not direct the discharge and depend on maintaining proper conveyor speed for unloading correctly. Depending on the speed of the conveyor, as the buckets go over an apex on the conveyor route, materials may spill out of the conveyor prematurely or too late. In addition, many bucket designs do not provide for going upward or downward at very steep angles. Spillage can be a problem at these portions of the conveyor path. Spillage and added dust from spillage can cause problems, such as damage to other machinery and also decreasing the amount of usable material which is successfully transported. Known bucket designs do not satisfactorily reduce spillage between adjacent buckets. All of these problems lead to inefficiencies and increased operational costs.

Although various bucket designs are known, buckets which are used with belt conveyors have not proven to be satisfactory for many uses. Chain conveyors may be used in some applications, but involve more moving parts, are more costly and have greater risk of malfunction or need of replacement. Belt conveyors also last longer, are lighter and require less power, don't corrode or rust, run quieter, and cause less metal contamination. In addition, belts have advantages when material has been spilled as the belts collect some spilled material and protect other machinery, which is not possible with chain conveyors. Furthermore, buckets may be mounted on various types of belts with a variety of compounds used in the belts, whereas chain conveyors require replacement of identical parts.

In addition, there are often problems with spillage at low lying levels of the conveyor and with wear on the top of the buckets as the buckets are being returned in an inverted position. Wear occurs not only to the cover or machinery around the buckets, but also to the buckets themselves so that they may not be usable. In addition, material which has been spilled can build up and cause additional wear and problems.

It can be seen then, that an improved bucket is needed which can be used with a belt conveyor and would solve problems relating to spillage at apexes or inclined angles. In addition, such a bucket should be easily mounted on belts and flow smoothly over bogies. The utility of such a conveyor would be increased further if it provides for reloading materials spilled on lower levels when the buckets are inverted and which can provide for wear without damage to the bucket and which does not wear the surrounding machinery or covering.

SUMMARY OF THE INVENTION

The present invention is directed to a conveyor apparatus and in particular to a conveyor apparatus utilizing buckets. A belt conveyor has buckets mounted thereon which receive material for transporting. In a first embodiment, each of the buckets includes a front wall and rear wall. Both walls slope forward and connect to side portions and a bottom. A rear lip extends rearward from the top of the rear wall and is configured so that it extends above the front wall of an adjacent following bucket. A wear bar or block is placed on the top of the rear lip. Should the buckets become inverted at any point along the return path, the wear block will support the bucket on an enclosure or other equipment. In addition, the wear block and rear lip and wall are configured to scoop up material that has fallen into a lower portion of the conveyor housing and to direct material falling on top of the block into the adjacent rear bucket.

In a second embodiment of the present invention, each of the buckets includes a bottom and sides connecting to a front wall angling forward. A rear wall includes a rearward angling lower portion connecting to a forward sloping upper portion. The forward angling portion includes a wear block mounted on an upper surface of the upper portion of the rear wall. With this configuration, the buckets can be closely spaced so that material falling on top of the wear block or upper portion of the rear wall directs material into the adjacent following bucket. If the upper portion of the bucket engages an enclosure or other equipment, the wear from abrasion will occur at the wear block, so that the bucket and surrounding machinery are not worn as quickly. Should the bucket become inverted on a return trip, the wear block will support the bucket so that the bucket and enclosure and other equipment do not wear as quickly.

In a third embodiment of the present invention, each of the buckets includes the bottom and sides connecting to a front wall angling forward and a rear wall angling forward. In this configuration, the buckets nest together for being transported along a vertical path. The walls are also configured for retaining the material and then having the front wall act as a discharge chute at the proper time so that the speed of the conveyor is not critical to proper unloading.

In a fourth embodiment of the present invention, a conventional bucket has an attachment mounted thereon. The attachment connects the front portion of the bucket to form an angled front wall which connects as a retaining surface and a discharge chute to control and direct the emptying of the bucket at the proper time and location.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letter indicate corresponding elements throughout the several views:

FIG. 1 shows a side sectional view of conveyor buckets mounted on a conveyor belt according to the principles of the present invention;

FIG. 2 shows a side elevational view of an enclosed belt conveyor with the buckets shown on FIG. 1;

FIG. 5 shows a side sectional view of a second embodiment of conveyor buckets mounting on a belt conveyor according to the principles of the present invention;

FIG. 6 shows a side view of a belt conveyor utilizing the buckets shown in FIG. 5;

FIG. 7 shows a side view of a third embodiment of a conveyor utilized for vertical transport according to the principles of the present invention;

DETAILED DESCRIPTION OF THE PREFERRED EMBODIMENT

Figure 3:
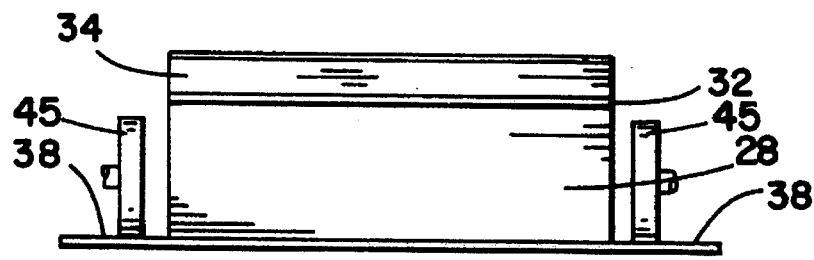
FIG. 3 shows a rear elevational view of a bucket shown in FIG. 1.

Referring now to the drawings and in particular to FIG. 2, there is shown a conveyor, generally designated 20. The conveyor 20 includes a series of buckets 22, shown more clearly in FIG. 1. Each of the conveyor buckets 22 includes a front and a rear wall, 26 and 28 respectively, attached to a bottom 30. Bucket sides 40 extend upward even with the front wall 26 in a preferred embodiment, but not quite to the level of the top of the rear wall 28, which extends slightly further upward than the front wall 26. The front wall 26 is angled forward while the rear wall 28 is angled forward as well. In a preferred embodiment, the rear wall 28 angles forward at a slightly more acute angle so that the buckets 22 nest when going around concave bends. It can be appreciated that depending on the incline of the conveyor system, the amount of slope of the front wall 26 and the rear wall 28 may be varied.

In addition, a rear lip 32 extends rearward from the top of the rear wall 28. The rear lip 32 extends rearward so that when the buckets are aligned, the rear lip 32 extends back over the top edge of the front wall 26 of the next bucket 22. A wear block 34 is mounted on top of the rear lip 32 and includes an upper surface angling rearward and a leading edge angling down and rearward toward the interior portion of the bucket 22. The buckets 22 mount to a belt type conveyor 24 with bolts 36 extending through a bottom portion 30 of the bucket and the belt 24. In a preferred embodiment, the bottom 30 of the bucket 22 is raised and forms a recess for mounting the bolts 36. The bolts 36 include an enlarged head for mounting the bucket 22 to the belt 24 and supporting the belt. The buckets 22 are generally mounted with two or more of bolts 36 aligned laterally across the bucket.

Figure 4:
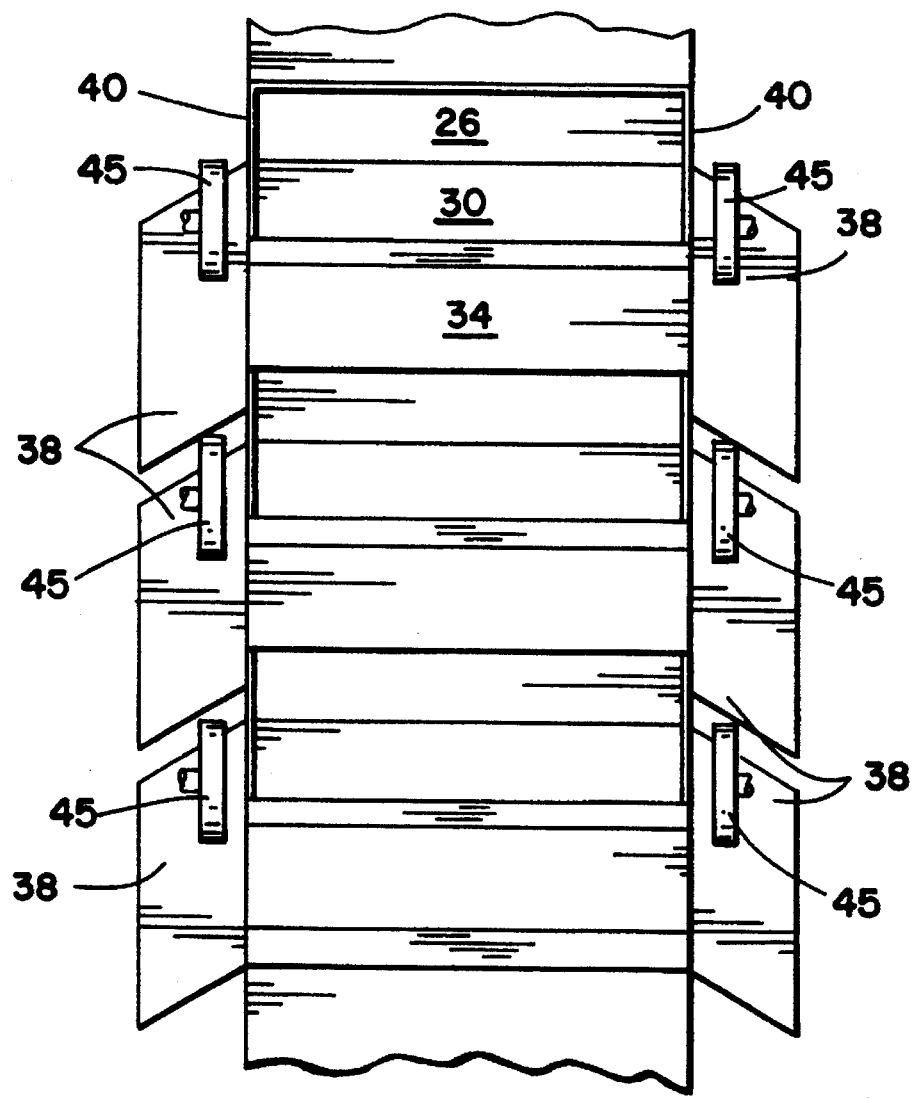
FIG. 4 shows a top plan view of three of the buckets shown in FIG. 1.

As shown in FIGS. 3 and 4, the buckets 22 also include wings or flanges 38 extending laterally outward from the bottom of each side of the buckets 22 and provide increased stability. The flanges 38 include swept back leading and trailing edges for passing more smoothly under bogies 45 that are encountered along the path of the conveyor 20. The flanges 38 ride under roller type bogies 45 to maintain contact with the belt 24. The angled leading and trailing edges also provide for improved match ups with adjacent buckets 22.

Referring again to FIG. 2, the conveyor apparatus includes pulleys 44 and bogies 45 which support the conveyor belt 24 and bucket flanges 38 at changes of direction along the path of the conveyor 20. In particular, at each directional change, the belt 24 must be supported. In the configuration shown, the belt 24 makes a concave bend and requires a slide plate type restraining member 42 engaging the tops of the wear blocks 34 or the bogies 45 engaging the flanges 38 to prevent the belt 24 from rising up and losing tension. A loader 46 directs material to fill the buckets 22 and a discharge chute 49 directs unloaded material. It can also be appreciated that the conveyor 20 directs the buckets 22 to a return position wherein the buckets are inverted. In the embodiment shown, the conveyor 20 is an enclosed system with a cover 48 surrounding the entire system.

Referring now to FIG. 5, there is shown a second embodiment of a conveyor bucket apparatus 52 utilized with a conveyor system 50, shown in FIG. 6. Each of the buckets 52 includes a front wall 56 and rear wall 58 connecting to a bottom 60 and sides 66. The rear wall 58 includes a lower portion 61 extending substantially vertically and an upper portion 62 which extends upward and forward from the lower portion 61. On the upper surface of the upper portion 62 is a wear block 64 extending above the upper portion. The bucket 52 mounts to a belt 54 with bolts 68 aligned laterally across the bucket.

The conveyor system 50 includes a fill chute 72 at a lower end thereof and an unloading chute 74 at an upper end thereof. In addition, a motor 76 is used to power the conveyor 50. On delivery, the conveyor belt 54 rides over idler rollers 78, and on return, the belt 54 rides over bogies 79 spaced intermittently throughout the length of the conveyor 50. Terminal pulleys 80 for change of direction are located at the upper and lower ends of the conveyor path. A cover 82 encloses the conveyor system 50.

Referring again to FIG. 2, in operation, the conveyor buckets 22 are loaded at a lower portion of the conveyor with material being dropped or otherwise directed from the loader 46 into the buckets 22. It can be appreciated that with the present design of the bucket 22, as shown in FIG. 1, material that is dropped between the front wall 26 and the forward edge of the rear wall 28 will fall into the bucket 22 while material which is dropped between the rear wall 28 of a first bucket and the front wall 26 of a following bucket will land on the wear block 34 attached to the rear lip 32. The sloping surface of the wear block 34 directs the material into the following bucket 22. As the buckets 22 proceed along the conveyor belt path, they pass an interior concave bend whereat the belt 24 has a tendency to rise up from the desired path. The retaining member 42 engages the wear blocks 34 or the bogies 45 engage the flanges 38 to hold the buckets 22 against the belt 24 so that the buckets 22 follow the general curve of the desired path. It can be appreciated that as the buckets 22 are folded together at this point, the increased slope of the rear wall 28 pivots toward the more vertical front wall 26 of the following bucket so that the buckets 22 can nest. In addition, the rear lip 32 can extend rearward into the following bucket over the upper edge of the front wall 26.

As the buckets 22 approach the apex at the top of the conveyor path, the buckets 22 tend to spread apart. The rear and front walls 28 and 26 of adjacent buckets are spaced far enough apart so that there is no impinging or binding between adjacent buckets 22. As the bucket 22 goes over the apex, gravity dumps the material out as the bucket goes over. It can be appreciated that the angle of the front wall 26 prevents premature unloading. The front wall 26 acts as a retaining wall and then a pour chute so that the material completely empties at the correct location at the discharge chute 49.

As the buckets 22 are returned, they are inverted at a lower portion of the conveyor path. In this position, it can be appreciated that the bogies 45 hold the flanges 38 up, but the tops of the buckets 22 may still fall against the enclosure 48 at times. If this happens, it can be appreciated that the wear bar 34 rides on the enclosure 48 and prevents the other portions of the bucket 22 from wearing on the enclosure 48. This prevents both wear and tear on the bucket 22 and also the enclosure walls 48. It can also be appreciated that as material may get trapped in various places, it tends to fall to the bottom of the enclosure 48. The angle of the leading edge of the wear block 34 guides the material upwards and towards the interior of the bucket 22 so that when the bucket 22 is raised back to a vertical position, the wear block 34 will direct the material downward toward the rear wall 28 of the bucket 22. As the bucket 22 returns to its normal orientation, the material falls to the bottom of the bucket 22 where it may be unloaded at its normal unloading location.

For the embodiment shown in FIGS. 5 and 6, the conveyor system 50 does not include an inside bend. In operation for this embodiment, each bucket 52 is loaded at a loading chute 72 at a lower end of the conveyor path. The buckets proceed up over the apex and are unloaded into a chute 74.

It can be appreciated that as each bucket 52 goes over the apex, the front wall 56 is low and angled to act as a retaining wall and then a pour chute so that the material falls out at the proper time and position. It can be appreciated that on the return path, the buckets 52 are in an inverted position. Should the buckets 52 fall against the enclosure 82, the wear block 64 is the only portion of the bucket 52 to rub on the enclosure 82. It can be appreciated that the easily replaceable wear block 64 and the bogies 79 support the buckets 52 so that no other parts wear and so that the enclosure 82 does not receive excess abrasion and wear. As the buckets 52 reach the lowermost portion of the conveyor path, the wear block 64 and upper portion 62 of the rear wall are configured to scoop any materials at the lowermost portion back into the bucket 52. It can be further appreciated that as the material is loaded, should any of the material fall upon the wear block 64 or rear wall upper portion 62, it will be directed over the front wall 56 of the following bucket so that spillage is minimized.

Referring now to FIG. 7, there is shown an embodiment of the belt conveyor, generally designated 100, such as may be utilized with a vertical conveyor. The conveyor 100 utilizes buckets 102 mounting on a belt 104 with bolts 114. The buckets include a front wall 106, a rear wall 108, sides 112 connecting to a bottom 110 to form an enclosure. The front and rear walls 106 and 108 both angle forward to aid in loading and unloading and also to provide for better nesting as the buckets 102 are positioned on the belt 104. In the embodiment shown, the belt 104 and buckets 102 proceed up over terminal pulley 116 and are unloaded into a chute 118. The conveyor system 100 is preferably enclosed with a cover 120.

In operation, the buckets 102 are lifted vertically as shown on the left side of FIG. 7, wherein the material being transported settles primarily against the rear wall 108, the bottom 110 and the sides 112. As the buckets 102 near the apex, the bucket 102 becomes more upright and the material shifts. Near the top of the conveyor path, the material falls so that it is not supported against as much of the rear wall 108 as it was when the buckets 102 were in a vertical position, and the material is still supported against the sides 112 and the bottom 110, as well as supported against a lower portion of the front wall 106. As each bucket 102 passes over the apex, it starts a downward path, the material shifts so that more is supported against the front wall 106 and less is supported against the rear wall 108. As the buckets 102 proceed further down the path, the front wall 106 passes below a horizontal plane and acts as a pour chute. At this point the material falls out of the buckets 102 and is guided into the unloading chute 118.

It can be appreciated that the angle of the front wall 106 is such that the material is directed in the proper direction and at the proper time with no spillage even at varied conveyor speeds. It can be appreciated that the front wall 106 is utilized as a retaining surface and then a pour chute. The front wall 106 discharges material at an optimum position and time and directs the material so that it clears the preceding bucket. When the buckets 102 have been emptied, they again nest for transport back to being reloaded.

Figure 8:
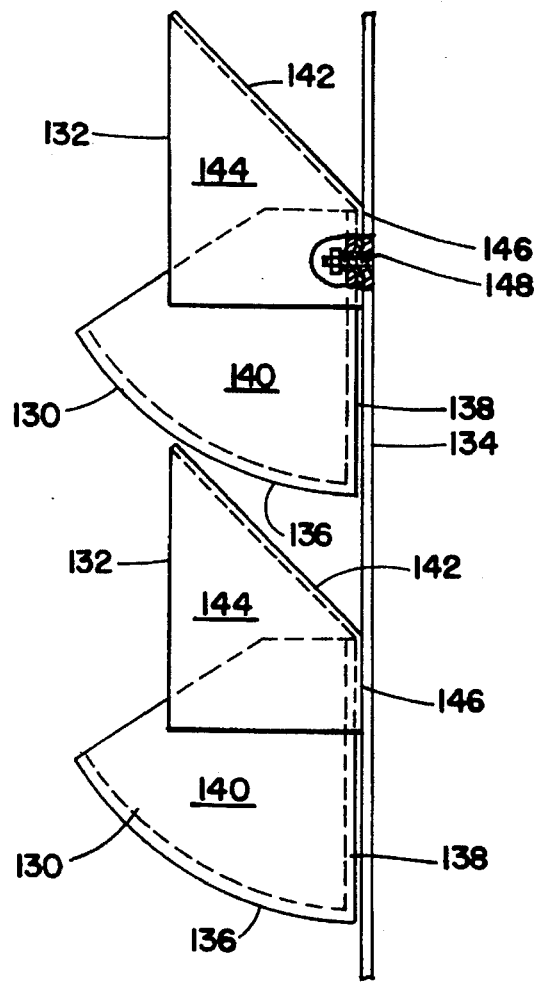
FIG. 8 shows a side view of a standard bucket with an attachment for controlled discharge according to the principles of the present invention.
Figure 9:
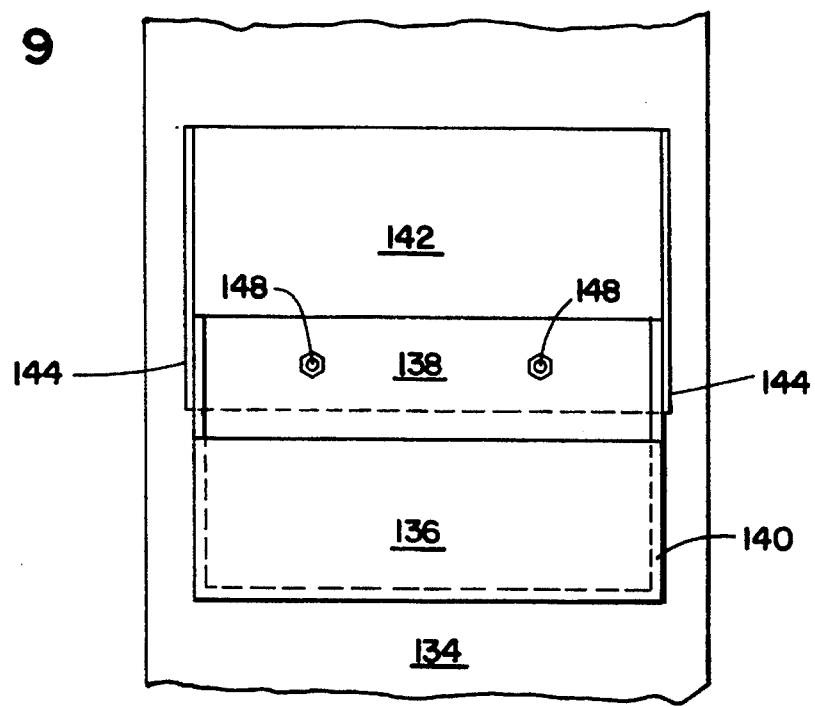
FIG. 9 shows a top plan view of the bucket shown in FIG. 8.

Referring to FIGS. 8 and 9, there is shown a further embodiment of the present invention whereby a conventional bucket 130 of a conveyor is converted to an improved bucket design by the addition of an attachment member 132. The conventional bucket 130 mounts to a belt 134 and includes a rounded back 136, a bottom 138 attaching to the belt 134, and side portions 140. However, there is no front wall. Therefore, in order to empty the bucket 130 correctly, the conveyor must be running at or near a predetermined speed. If the speed is too fast or too slow, the material will be discharged at an incorrect point in time so that the material may be dispersed without being directed to its proper unloading point.

According to the present invention, the attachment member 132 is mounted on the front of the existing bucket 130. The attachment 132 includes sides 144 and a sloped front wall portion 142 connecting to a bottom portion 146. The attachment member 132 connects with an existing bolt 148 inserting through the bucket 130, attachment member 132 and belt 134. In addition, other types of mounting devices or methods may also be utilized. The sides 140 and 144 overlap to prevent leakage. In addition, the front wall 142 acts as a retaining surface and also a pour chute. Therefore, the speed of the conveyor can be slower as the front wall 142 directs the material to unload at the proper time and position. In addition, discharge is more confined so that it will not be a wide uncontrolled discharge which disburses.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A conveyor apparatus having at least a pair of pulleys over which the conveyor passes to change the direction of the conveyor, comprising:

a plurality of buckets, comprising:
    a front wall, a rear wall, and a pair of side walls, the front and rear walls slanting in a first direction, the rear wall including a lip extending rearward, wherein as the conveyor passes over a pulley to empty the buckets, the front wall of one of the buckets extends substantially horizontally beyond the rear wall and lip of an adjacent lower bucket;

a belt conveyor, wherein the plurality of buckets mount on the belt.

2. A conveyor apparatus according to claim 1, further comprising a lip attaching at an upper portion of the rear wall and extending back.

3. A conveyor apparatus according to claim 1, wherein the buckets include a flange extending laterally at a lower portion of each of the side walls, the flange riding on the belt.

4. A conveyor apparatus according to claim 2, wherein the buckets are aligned on the belt so that the rear lip of a first bucket extends over the front wall of a second bucket.

5. A conveyor apparatus according to claim 3, wherein the front wall extends at a first angle relative to the belt and the second wall extends at a second angle relative to the belt, the second angle being more acute than the first angle.

6. A conveyor apparatus according to claim 5, wherein the rear wall extends further upward than the front wall.

7. A conveyor apparatus according to claim 3, wherein each of the flanges includes a swept back leading edge.

8. A conveyor apparatus according to claim 7, wherein each of the flanges includes a swept back trailing edge.

9. A conveyor apparatus according to claim 3, wherein the conveyor further comprises bogies mounted along a path of the conveyor wherein the flanges are intermediate the bogies and the belt.

10. A conveyor apparatus according to claim 2, further comprising a wear block mounted at the top portion of the rear lip.

11. A conveyor apparatus according to claim 10, wherein the wear block comprises an upper surface angling rearward and a leading edge angling downward.

12. A conveyor apparatus according to claim 4, further comprising a wear block attached to an upper portion of the rear lip.

13. A conveyor bucket apparatus, comprising:

a bucket portion including front and rear walls, a pair of side walls and a bottom;

a lip extending from a top end of the rear wall;

a wear block attached to the top of the lip, wherein the wear block includes a leading edge extending downward.

14. A conveyor bucket apparatus according to claim 13, wherein the wear block comprises an upper surface sloping downward to the rear.

15. A conveyor bucket apparatus comprising:

a unitary bucket portion including a front wall, a rear wall, and a pair of side walls attached to a bottom; wherein the rear wall includes an upper portion extending upward and forward above the side walls;

a wear block attached to an upper surface of the upward angled portion of the rear wall.

16. A conveyor bucket according to claim 15, wherein the front wall slopes forward and extends upward to a lower point than the side walls.

17. A conveyor bucket apparatus according to claim 15, wherein the bucket apparatus mounts to a belt conveyor.

18. A conveyor bucket apparatus, comprising:

a bucket portion including a rear wall, opposing sides and a bottom forming an open front;

an attachment member detachably mounting to the bucket portion; the attachment member including opposing sides, a bottom and an angled front wall, wherein the attachment member and bucket portion form a bucket having an angled front wall.

19. A conveyor bucket apparatus according to claim 18, wherein the rear wall is angled to nest with the front wall of an adjacent bucket.

20. A conveyor bucket apparatus, comprising:

a bucket portion including a pair of sides, a bottom, a front and rear wall, and a wing extending outward from each of the sides at a lower portion of the bucket, wherein each of the wings comprise leading edges angling away from the bucket;

means for mounting the bucket portion onto a flat conveyor belt.

21. A conveyor bucket according to claim 20, further comprising a lip extending rearward off the rear wall of the bucket.

22. A conveyor apparatus, comprising:

a plurality of buckets, comprising:
    a front wall, a rear wall, and a pair of side walls, the front and rear walls slanting in a first direction, the rear wall including a lip extending rearward;

a plurality of bogies mounted along the path of the conveyor;

a belt conveyor, wherein the plurality of buckets mount on the belt, wherein the buckets include a flange extending laterally at a lower portion of each of the side walls, the flange riding on the belt intermediate the bogies and the belt.

* * * * *